E. L. ANKROM.
COOKING UTENSIL.
APPLICATION FILED MAR. 26, 1909.
944,998.
Patented Dec. 28, 1909.
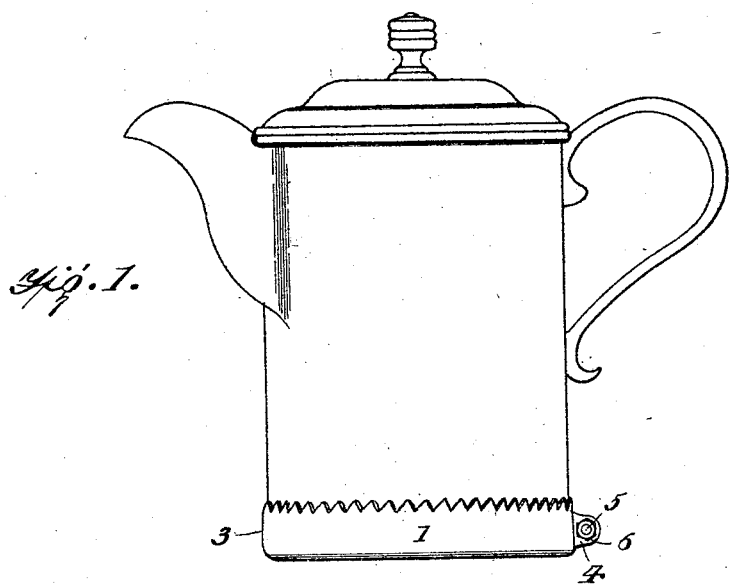
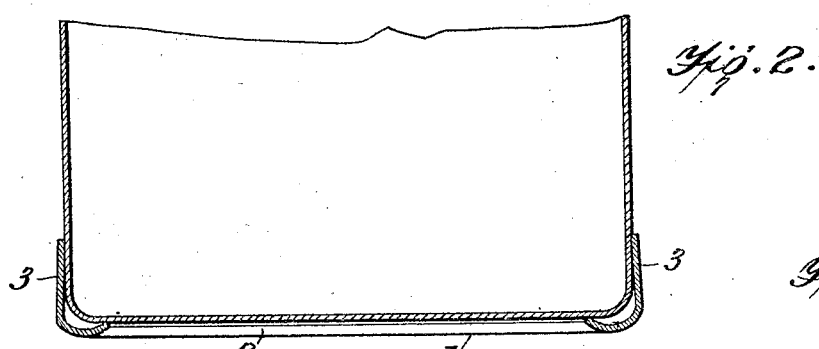
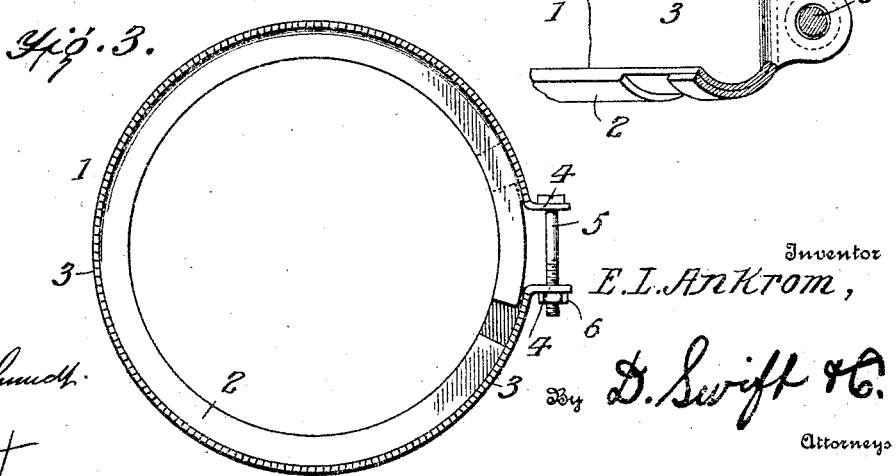

UNITED STATES PATENT OFFICE.

EDWARD LINCOLN ANKROM, OF QUAKER CITY, OHIO.

COOKING UTENSIL.

944,998.  Specification of Letters Patent.  Patented Dec. 28, 1909.

Application filed March 26, 1909. Serial No. 485,982.

*To all whom it may concern:*

Be it known that I, EDWARD L. ANKROM, a citizen of the United States, residing at Quaker City, in the county of Guernsey and State of Ohio, have invented new and useful Cooking Utensils; and I do hereby declare the following to be a full, clear, and exact description of the invention, such as will enable others skilled in the art to which it appertains to make and use the same.

The invention relates to cooking utensils and has for its object to provide an improved device of this character having means for protecting fine quality utensils from wear on the bottom and from the injury resulting from contact with a heated stove.

Another object of the invention is to provide a cooking utensil having an attachment which may be applied thereto when desired and readily removed from the same when desired.

With these and other objects in view, the invention consists in the novel construction and arrangement of parts hereinafter described and shown, and particularly pointed out in the appended claim.

In the drawings, Figure 1 is a side elevation of a cooking utensil constructed in accordance with this invention. Fig. 2 is a vertical sectional view taken through the utensil and the attachment. Fig. 3 is a plan view showing the attachment removed from the utensil. Fig. 4 is a sectional view.

Referring to the drawings, 1 designates a split annular member or ring having a concaved-conveyed bottom portion 2 and a side portion 3 which form an angle as clearly shown in Fig. 2 of the drawings. The portion 2 engages the bottom of the utensil so as to leave an air space between the bottom and said portion, which air space serves to protect the utensil from being scorched.

The annular member or ring is designed to receive the bottom of a cooking utensil and to hold the same out of engagement with the stove. The side portion 3 is slightly inclined inwardly so as to firmly clamp the vessel or cooking utensil as will be hereinafter explained.

The annular member or ring 1 is provided with outwardly projecting ears 4 having perforations in which is inserted a bolt 5 engaged by a screw-threaded nut 6. The ears 4 are formed integrally with the annular member or ring, as clearly shown. When the cooking utensil is seated in this ring, said ring is clamped to the vessel by screwing the nut 6, as will be be readily understood.

It will be seen that my invention is capable of protecting copper and nickel plated cooking utensils and that the same can be readily moved from said utensil when desired for washing or any other purpose.

I desire it to be understood that changes in the form, proportion and minor details of construction may be resorted to, without departing from my invention.

What is claimed is:—

In combination with a cooking utensil or vessel having a bottom, an annular split member having a portion deflected inwardly adapted to engage with the side of the utensil or vessel and a convexed-concaved portion adapted to engage with the bottom of the vessel and to leave an air space between said portion and said bottom, said annular split member being formed with outwardly projecting ears, and a clamping nut and bolt secured to the ears adapted to hold the annular split member removably on the bottom of the utensil or vessel.

In testimony whereof I have signed my name to this specification in the presence of two subscribing witnesses.

EDWARD LINCOLN ANKROM.

Witnesses:
I. Y. DAVIS,
J. G. STOCKDALE.